March 20, 1962 H. P. HOGARTH 3,025,644
METHOD AND APPARATUS FOR FORMING TAPERED
SURFACES ON ELONGATE MEMBERS
Filed Aug. 24, 1959 2 Sheets-Sheet 2
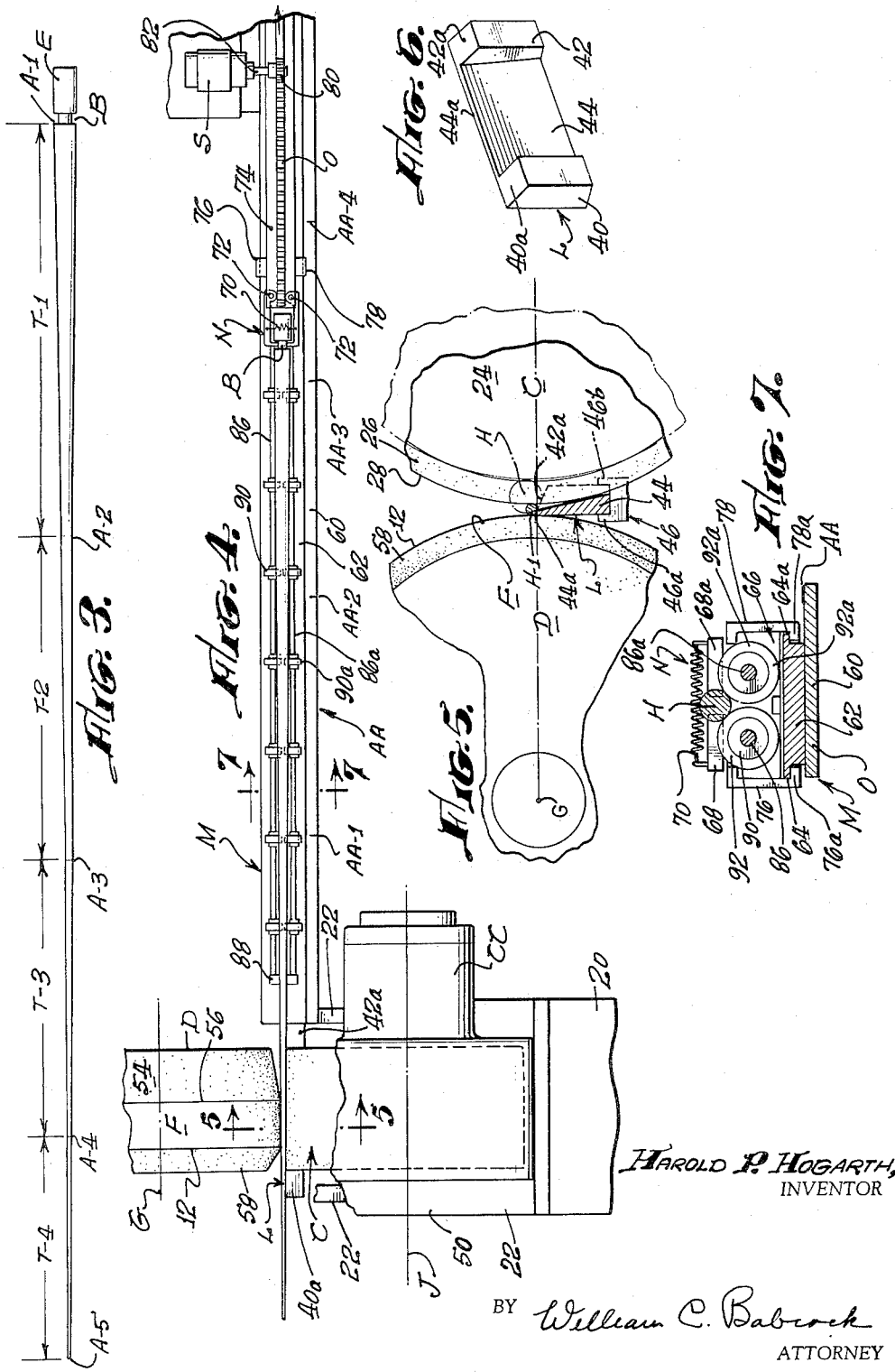
Harold P. Hogarth,
INVENTOR
BY William C. Babcock
ATTORNEY

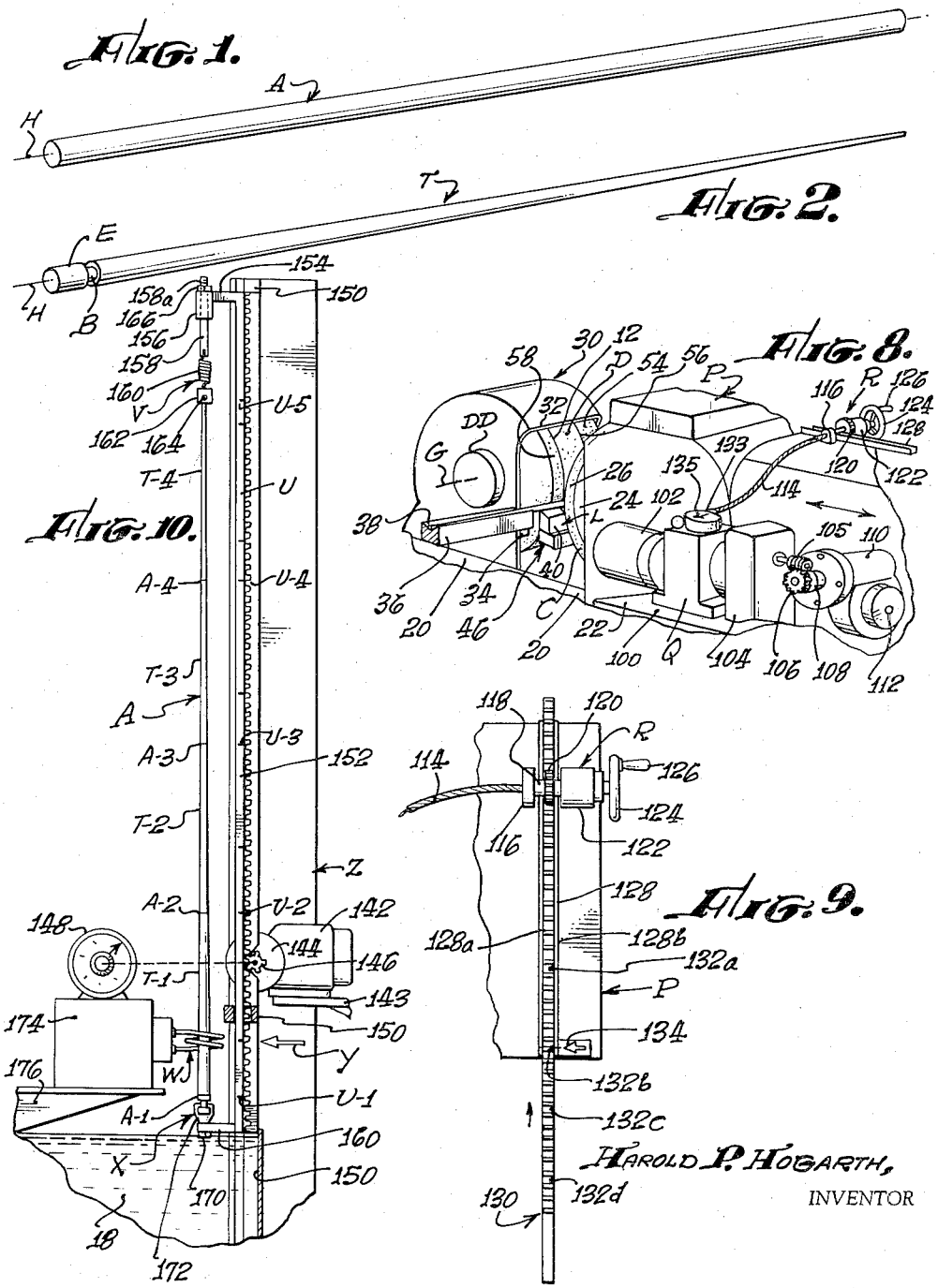

United States Patent Office 3,025,644
Patented Mar. 20, 1962

3,025,644
METHOD AND APPARATUS FOR FORMING TAPERED SURFACES ON ELONGATE MEMBERS
Harold P. Hogarth, 5936 Clara St., P.O. Box 2127, Bell Gardens, Calif.
Filed Aug. 24, 1959, Ser. No. 835,619
13 Claims. (Cl. 51—103)

During recent years, sports fishing rods have been fabricated from fibreglass sheeting impregnated with a polymerized resin that is wound about a rigid elongate tapered member until the resin is cured. Thereafter the sheeting and solidified resin is slipped from the member, and the solidified resin reinforced by the fibreglass is in the shape of a hollow tapered rod that is both resilient and strong. Initially, in the production of such fibreglass fishing rods, it was common practice to form same with a uniformly tapering bore. However, as the art of fabricating such fibreglass rods developed, it was found that those having a desired resiliency, degree of bend under load, and the snap desired for casting could be accurately controlled by forming the rods with a series of longitudinally extending tapered interior surfaces, each of a different degree of angulation rather than one interior tapered surface of uniform angulation extending the length of the rod.

Obviously, the formation of a fishing rod having multiple interior tapered surfaces, each of a different degree of angulation, required the use of an elongate member or mandrel having such tapered surfaces formed thereon. The production of an elongate member for so forming a fibreglass rod thereon presented a most serious problem, for the member was so long relative to the transverse cross section thereof that when supported from its ends it deformed substantially due to the weight of the rod. Thus, special supports were required to maintain such a member in a longitudinally aligned position, if same was to be rotated, and multiple tapered surfaces ground thereon.

Hand grinding of multiple tapered surfaces on such an elongate member not only required personnel possessing a high degree of technical skill, but was time consuming, and as a result the finished multiple tapered rod was a most expensive item. Polymerizing of the resin impregnating the fibreglass sheet wound about one of such multiple tapered elongate forming members requires an appreciable length of time. Therefore, a manufacturer commercially producing fibreglass fishing rods requires not one elongate member having multiple tapered surfaces formed thereon, but hundreds, each having tapered surfaces of identical angulation and configuration. From experience it was found to be literally impossible to produce in quantity such elongate members with multiple tapered surfaces formed thereon that were identical, due to human error in the time consuming and tedious work of grinding same. Furthermore, even when skilled operators were found capable of consecutively grinding elongate members to form identical tapered surfaces thereon, the cost of the finished ground members was so high as to be almost prohibitive.

A major object of the present invention is to provide a method that permits the fast, economical production of elongate rigid members, each having multiple tapered surfaces formed thereon that are identical in angulation and configuration, whereby a manufacturer using same in forming hollow tapered fishing rods or other elongate internally tapered tubular products is assured that each product he manufactures will be identical insofar as the interior tapered surfaces thereof are concerned, irrespective of the particular one of the elongate tapered members or mandrels on which it is formed.

Another object of the invention is to supply a method that may be carried out by relatively unskilled operators having little or no previous experience in hand grinding of tapered surfaces, and one by which the possibility of human error is substantially eliminated.

A still further object of the invention is to provide an apparatus that can be conveniently used in carrying out the method.

Yet another object of the invention is to furnish an apparatus that is compact, relatively simple in structure, requires a minimum of maintenance attention, and performs the grinding operation in a rapid and economical manner.

A still further object of the invention is to supply to the trade elongate members, each having a desired sequence of longitudinally extending tapered surfaces formed thereon at a sufficiently low price as to not only encourage their widespread use in forming fibreglass fishing rods thereon, but also in the formation of other tubular products on which it is desired to have one or more longitudinally extending interior tapered surfaces.

These and other objects and advantages of the invention will become apparent from the following description of the method and a preferred form of apparatus that may be used in carrying out same, and from the accompanying drawings illustrating the apparatus and method in which:

FIGURE 1 is a perspective view of a rod or elongate member that is of raw stock prior to being subjected to the present method;

FIGURE 2 is a perspective view of the rod shown in FIGURE 1 after it has been rough tapered;

FIGURE 3 is a side elevational view of the elongate rod after it has been finish-ground to have a sequence of longitudinally extending tapered surfaces formed on the exterior thereof, with each surface being of a different but desired angulation;

FIGURE 4 is a stop plan view of the apparatus used in sequentially forming a number of longitudinally extending tapered surfaces of different but desired angulations on the rough tapered elongate member shown in FIGURE 2;

FIGURE 5 is a fragmentary vertical cross-sectional view of the apparatus shown in FIGURE 4 taken on line 5—5 thereof which illustrates the lateral shifting of the axis of rotation of the rod being ground as the rod is moved longitudinally between a resilient roller and an adjacent grinding wheel;

FIGURE 6 is a perspective view of a support for that section of the elongate member situated between the resilient roll and grinding wheel;

FIGURE 7 is a vertical cross-sectional view of the apparatus shown in FIGURE 4 taken on line 7—7 thereof, illustrating the manner by which an end portion of the elongate member on which the tapered surfaces are being formed is rotatably gripped, and force applied thereto to move the member between the resilient roll and grinding wheel;

FIGURE 8 is a perspective view of that portion of the apparatus shown on the left-hand side of FIGURE 4, illustrating a laterally movable head, a resilient roller rotatably supported thereon, and a variable speed cross-feed control for the laterally movable head;

FIGURE 9 is a plan view of a rapidly operable control for regulating the rate at which the laterally movable head and resilient roller is advanced toward the grinding wheel; and FIGURE 10 is a side elevational view of an apparatus that permits the elongate member, after a number of longitudinally extending tapered surfaces have been formed thereon, to be lowered at varying rates through a heating zone and thereafter quenched to impart a desired resiliency to the finished elongate member. The method of transforming a rod or elongate member A shown in FIGURE 1 to a member having a plurality of longitudinally extending tapered surfaces T–1, T–2, T–3 and T–4 formed on the exterior surface thereof as shown in FIGURE 3, includes a first step of rough grinding all but an end portion E of member A by conventional means (not shown) to a longitudinally extending taper T.

End portion E and that portion of elongate member A which is rough tapered are separated by a ring-shaped recess B cut into the member A for reasons to be explained hereinafter. The transverse cross section of the rough taper is greater at any position on member A than that of any one of the particular finished tapered surfaces T–1 to T–4 inclusive. A power-driven resilient roller C is provided, as well as a power-driven grinding wheel D having a frusto-conical grinding surface F, best seen in FIGURE 4. Surface F is formed with a taper that has an angulation relative to the axis of rotation G of the grinding wheel that is the average of the angulation of the tapered surfaces T–1, T–2, T–3 and T–4 to be formed on the elongate member A relative to the longitudinal axis H thereof.

The resilient roller C (FIGURE 8) rotates on an axis of rotation J that is in the same horizontal plane as the axis of rotation G of grinding wheel D. The central portion of a support L shown in FIGURE 6 is disposed between the roller C and wheel D in such a manner as to at all times maintain the longitudinal axis H of member A above the horizontal plane extending between the axes G and J previously mentioned during the grinding of tapered surfaces T–1 to T–4 inclusive.

An elongate supporting member M, best seen in FIGURE 4, extends outwardly from one side of resilient roller C and grinding wheel D which serves to not only slidably support the elongate member A for longitudinal movement relative to wheel D and roller C, but to support the elongate member to permit rotation thereof on its axis H as well. A gripping member N, as may best be seen in FIGURES 4 and 7, rotatably engages the recess B, and when force is applied to the gripping member by a power-actuated rack O, the elongate member A may be drawn longitudinally between the resilient roller C and grinding wheel D. Roller C, as shown in FIGURE 8, is mounted on and forms a part of a laterally movable head assembly P that may be moved relative to grinding wheel D at a desired rate by power means Q which may be adjustably controlled by a mechanism R shown in FIGURE 9, the structure of which will later be described in detail.

The sequential grinding of the tapered surfaces T–1, T–2, T–3 and T–4 on the elongate member A, which already has the rough taper T formed on the external surface thereof as shown in FIGURE 2, is accomplished by moving the rack O relative to support M to a position where the gripping member N may rotatably engage recess B. The resilient roller head assembly P is moved away from the grinding wheel P to the extent that the right-hand end of taper T–1 is adjacent the circumferentially extending line 12 that defines the left-hand boundary of the grinding surface F.

The rack O and gripping member N are then caused to move to the right (FIGURE 4) by use of a reversible constant speed motor S. Roller C is caused to rotate at a constant speed by a prime mover CC such as an electric motor, or the like, shown in FIGURE 5, and the grinding wheel D is likewise caused to rotate at a constant speed by a motor DD, best seen in FIGURE 8. Before the elongate member A is drawn between the resilient roller C and grinding wheel D, the roller C is moved inwardly toward the wheel D by use of the control mechanism R to a position where the rotating roller frictionally contacts the right-hand end portion of the elongate member to force it into pressure contact with the rotating wheel D. Sufficient force is exerted by the roller C on member A to cause same to rotate on its longitudinal axis H, as may best be seen in FIGURE 5.

Member A is thereafter drawn longitudinally between roller C and wheel D at a constant rate, and by the use of the control mechanism R the rate of lateral movement of the head assembly P toward wheel D is periodically varied upon completion of the grinding of each of the tapered surfaces T–1, T–2 and T–3 on the elongate member A. The rate at which the roller C must move toward wheel D is dependent both upon the length of the taper T–1, T–2, T–3 or T–4 being formed, and the angulation of such taper.

At the start of forming the tapered surface T–2, for instance, the control mechanism R is varied to change the rate of movement of roller C toward wheel D, with the new rate being such that the axis of rotation J of roller C will have moved toward the longitudinal axis of member A a distance amounting to the difference between the diameter of member A at the lines A–2 and A–3 thereon by the time the length of the elongate member A between lines A–2 and A–3 thereon has moved past the edge 12 of wheel D. Thus, at the beginning of the forming of a different tapered surface at each of the lines A–1, A–2, A–3 and A–4 on member A, the control R is utilized to vary the rate of movement of head assembly P toward wheel D, with each new rate selected being one that will complete the grinding of a desired surface by the time the length of member A on which the desired surface is being formed has moved past the peripheral edge 12 of wheel D at a constant rate by movement of the rack O as previously explained.

To facilitate the periodic variance in the rate of movement of the head assembly P toward wheel D to form tapers in the manner above described, it has been found desirable to use a longitudinally extending scale or index AA, best seen in FIGURE 4, supported in a lengthwise position along support M. Index AA may have a number of index markings AA–1, AA–2, AA–3 and AA–4 thereon, and as the point A–1 or other desired index mark (not shown) on the elongate member A is sequentially brought into lateral alignment with each of these index marks AA–1, AA–2, AA–3 and AA–4 the rate at which the head assembly P is laterally advanced toward wheel D must be varied to grind the next of the desired tapers T–1, T–2, T–3 or T–4 on the member A as it passes between the wheel D and roller C.

During formation of the tapered surfaces T–1 to T–4 thereon (FIGURE 5), member A slidably and rotatably rests on the upper tapered faces of the support L shown in FIGURE 6. The taper of these faces is such that although the transverse cross section of the elongate member A decreases as the member is drawn toward the motor S, the longitudinal axis H is at all times maintained above the horizontal plane extending between the axis of rotation G and J of the grinding wheel D and resilient roller C. It will be noted in FIGURE 2 that as tapers T–1, T–2, T–3 and T–4 become pregressively smaller in transverse cross section, the longitudinal axis of rotation of the section of the elongate member A being drawn shifts toward wheel D, and as shown in FIGURE 5 moves from an initial position H to a new position H–1.

It will also be apparent that as the transverse cross section of the elongate member A decreases, the circumferential exterior surface defining same also decreases. Therefore, when the circumferential surface of the section being ground is in frictional contact with the resilient roller C and rotated thereby, the rate of rotation of member A tends to increase as the circumference of the tapered surface being formed decreases. After tapered surfaces T–1, T–2, T–3 and T–4 have been formed on a member A as above described, it is removed from the grinding apparatus and the tip portion A–5 thereof is removably gripped in a spring-loaded clamp V, as shown in FIGURE 10. Member A depends vertically from clamp V and when so disposed is moved through an induction heating coil W. The lower end portion of member A is then gripped by a second clamp X at the recess B. A vertically disposed rack U is located adjacent the dependent member A having marks U–1, U–2, U–3 and U–4 thereon that are in annealing temperature. On the first run of a member A having tapers T–1, T–2, T–3 and T–4 of a new transverse cross section, the rate at which each tapered section must be moved downwardly to bring the metal defining same is determined empirically by use of an optical pyrometer (not shown). A written record is kept of the rate at which each tapered surface T–1 to T–4 must be moved downwardly through coil W to raise the metal defining same to a desired temperature. Thus, when succeeding members A of the same multiple taper are heat treated, the rate of downward movement thereof is varied each time one of the marks U–1, U–2, U–3 and U–4 becomes horizontally aligned with arrow Y.

The oil bath 18 serves to quench the steel and impart resiliency thereto. The particular bath used, or whether any bath at all will be used, is dependent on the particular physical characteristics of the steel employed in forming the elongate member A on which the tapered surfaces T–1, T–2, T–3 and T–4 are formed.

The structure of a preferred form of apparatus used in carrying out the previously described method includes a frame or other supporting structure 20 of any desired shape (FIGURE 8) that serves to maintain the grinding wheel D, support M, and the motor S in fixed relationship and at a convenient elevation above a floor surface (not shown) for operation and maintenance purposes. The head assembly P on which resilient roller C is mounted is movably supported on a transversely positioned bed 22 for movement either toward or away from the grinding wheel D at a desired rate of speed. Likewise, the rack O is movable relative to the support M in either direction thereon by use of the reversible constant speed motor S, as may best be seen in FIGURE 4.

Roller C preferably includes a hard cylindrical core 24 (FIGURE 5) that has a circumferentially extending band 26 of resilient material, such as rubber or the like, rigidly affixed thereto. Band 26 defines a flat cylindrical surface 28 that frictionally grips consecutive longitudinally extending sections of the elongate member A as the member is drawn past same, and is forced into pressure contact therewith by grinding wheel D.

A hood 30 extends partially around grinding wheel D, and this hood terminates adjacent the roller C in an inverted U-shaped edge 32. That portion of the grinding wheel D most adjacent the roller C projects from hood 30. A lug 34 affixed to the interior surface of hood 30 supports an elongate guide 36 as may be seen in FIGURE 8, which projects from hood 30 in a direction opposite to that in which the support M extends. A longitudinally extending recess 38 of V-shaped transverse cross section is formed in guide 36. That portion of guide 36 in which recess 38 is formed slidably and rotatably supports a portion of the elongate member A before it is moved between the resilient roller C and grinding wheel D. By means (not shown) grinding wheel D is rotatably supported on a fixed axis of rotation G within the confines of hood 30, and is driven by the motor DD shown in FIGURE 8.

As previously mentioned, the support L (FIGURE 6) is used to rotatably and slidably support that portion of member A disposed between roller C and wheel D during the time member A is being ground to define part of one of the tapered surfaces T–1, T–2, T–3 or T–4 thereon. Support L is structurally defined by two longitudinally spaced, parallel uprights 40 and 42 of identical shape having a rigid, vertically positioned flat panel 44 extending therebetween and connected thereto. The upper ends of uprights 40 and 42 terminate in two upwardly inclined surfaces 40a and 42a respectively, lying in a common plane. The top of panel 44 also terminates in a longitudinally extending edge surface 44a that is inclined upwardly and lies in a plane common to surfaces 40a and 42a.

A mounting 46 is rigidly affixed to the upper surface of frame 20, located under and between the resilient roller C and grinding wheel D. Mounting 46 serves to maintain support L in a fixed position relative to grinding wheel D, with the uprights 40 and 42 being positioned on opposite sides of the wheel. The panel 44 is so disposed between roller C and wheel D as to slidably and rotatably engage the under surface of the elongate member A being ground, at least during the period when the tapered portions of smallest cross section are being formed thereon, as can best be seen in FIGURE 5. From an examination of FIGURES 5 and 8, it will be seen that when the section of largest transverse cross section such as section T–1 (FIGURE 3) is initially being ground by grinding wheel D, the longitudinal axis H of the elongate member A is disposed above the plane extending between the axes of rotation G and J, and the lower surface portion of member A is disposed between roller C and wheel D, resting solely on the upper faces 40a and 42a as shown in FIGURE 6. However, as the elongate member A is drawn between the resilient roller C and the grinding wheel D, the transverse cross section of member A decreases, and as it decreases the longitudinal axis of rotation H moves laterally toward the grinding wheel D to occupy the position H–1 shown in FIGURE 5. When the transverse cross section of member A being ground has materially decreased in cross section, this portion of the member is rotatably supported not only on the upper surfaces 40a and 42a of support L, but also on the upper inclined edge 44a of panel 44 as shown in phantom line in FIGURE 5.

The mounting 46 may vary in design, but it has been found convenient to use a block which rests on the upper surface of frame 20. Mounting block 46 has two longitudinally extending laterally spaced ribs 46a and 46b that engage opposite sides of the two uprights 40 and 42 (FIGURES 5 and 6). A particularly important consideration in the structure of the apparatus used in carrying out the present method is the configuration of the grinding wheel D that is driven at a constant speed by the motor DD. As is conventional with such devices, grinding wheel D is formed of compacted or otherwise adhered hard particles such as carborundum or the like. In configuration wheel D includes a central section which is defined by the previously mentioned frusto-conical grinding surface F. The left-hand side of surface F is bounded by the circumferentially extending line 12 and on the right-hand side by a circumferentially extending line 56. The taper required on surface F to best carry out the method of the present invention has been described previously in detail and need not be repeated.

A second frusto-conical surface 54 is also defined on grinding wheel D that tapers inwardly toward the axis of rotation G relative to the axis of rotation H of member A at an angle that is approximately six times the average angle of taper of surfaces T–1, T–2, T–3 and T–4 relative to the longitudinal axis H. The second tapered surface 54 and surface F (FIGURE 4) define the circumferentially extending line 56 at the junction thereof on wheel D.

A third inwardly tapering frusto-conical surface 58 is also formed on grinding wheel D and is situated to the left of surface F as shown in FIGURE 4. The junction of surfaces 58 and F define the circumferentially extending line 12 on grinding wheel D previously mentioned. The angulation of surface 58 relative to the axis of rotation G of grinding wheel D is opposite to that of second surface 54. Also, it is desirable that the angle of taper of the third surface 58 be greater than that of the taper of second surface 54. It has been found from experience that the angulation of surface F and second grinding surface 54 is critical in sequentially grinding tapered surfaces T-1, T-2, T-3 and T-4 on a number of elongate members A if such surfaces are to be smooth when finish-ground, with a minimum of deviation between corresponding tapered surfaces on a number of the members A.

Support M (FIGURES 4 and 7) includes an elongate rectangular rigid base 60 having a longitudinally extending member 62 affixed to the upper surface thereof. Member 62 defines two parallel laterally separated rails 64 and 64a. A carriage 66 which supports the gripping member N is slidably mounted on member 62. Member N comprises two laterally movable, coaxially aligned bars 68 and 68a which are at all times urged inwardly toward one another by a tensioned helical spring 70 extending therebetween. Carriage 66 is connected by bolts or other fastening means to the end of an elongate member 74. Rack O extends longitudinally along and is affixed to the upper surface of member 74.

Several pairs of longitudinally spaced channel-shaped guides 76 and 78, one pair of which is shown in FIGURES 4 and 7, are affixed in upright position to opposing longitudinal sides of member 74. Each pair of guides 76 and 78 have flanges 76a and 78a, respectively, which extend under and slidably engage rails 64 and 64a. Rack O at all times engages a pinion 80 that is mounted on an end portion of a horizontal shaft 82 (FIGURE 4) which is driven by the reversible constant speed motor S. When motor S is energized to rotate the sprocket 80 in an appropriate direction and the bars 68 and 68a are in detachable engagement with recess B, the elongate member A can be drawn longitudinally over support M away from resilient roller C and grinding wheel D.

Two elongate shafts 86 and 86a are supported by a number of longitudinally spaced brackets 88 affixed to the upper surface of member 62, one of which brackets is shown in plan in FIGURE 4. Shafts 86 and 86a rotatably support a number of longitudinally spaced pairs of rollers 90 and 90a, respectively. If desired, rollers 90 and 90a can be covered by circumferentially extending layers 92 and 92a of resilient material such as hard rubber or the like. Layers 92 and 92a protect the ground tapered surfaces T-1, T-2, T-3 and T-4 from scratches, abrasion or the like as member A is slidably and rotatably moved thereover by action of rack O as it moves away from the resilient roller C and grinding wheel D.

After surfaces T-1, T-2, T-3 and T-4 have been ground on member A by use of the apparatus above described, bars 68 and 68a are moved outwardly against the tension of spring 70 to permit their disengagement from recess B, and permit removal of member A on which the multiple tapered surfaces have just been ground. The machine is then ready to receive another elongate member A such as shown in FIGURE 2. Although member A (FIGURE 3) has four tapered surfaces of different angulation formed thereon, this particular number of surfaces is shown for the purposes of illustration only, and it will be obvious that any desired number of tapered surfaces can be formed on this member by means of the method together with the apparatus just described.

Lateral movement of the head assembly P takes place on a bed 100 on which it is slidably mounted. Power for moving assembly P on bed 100 is provided by a motor 102 that drives the variable speed transmission Q which in turn drives a gear box 104. A power-driven worm gear 105 projects from box 104. Gear 105 threadedly engages a helical gear 106 mounted on the outer end of a shaft 108 extending through a housing 110 to drive a shaft 112 normally disposed relative to the axis of rotation J of roller C. Shaft 112 has threads (not shown) formed thereon which threadedly engage the tapped interior portion (not shown) of head assembly P. When motor 102 which is of the constant speed type and is reversible, is energized to rotate in either of two possible directions, the shaft 112 is rotated to move the head assembly P either toward or away from the grinding wheel D as desired. The variable speed transmission Q, as is conventional with such devices, is controlled by rotating an elongate flexible member 114 connected thereto, as shown in FIGURE 8. The end of member 114 not connected to transmission Q is affixed to a collar 116, or other fastening means mounted on one end of a shaft 118. Shaft 118 also rigidly supports a sprocket 120, as best seen in FIGURE 9.

A portion of shaft 118 is rotatably supported in a journal box 122 that is rigidly connected to a portion of the head assembly P, and an outer end portion of this shaft extends from the journal box 122. A hand wheel 124, preferably having a handle 126 extending outwardly therefrom, is affixed to the outer extremity of shaft 118. Rotation of wheel 124 results in concurrent rotation of the flexible member 114 to control the rate at which the variable transmission Q drives the gear 105. The rate at which gear 105 rotates determines the rate at which the head assembly P moves toward or away from grinding wheel D.

An elongate track 128 is provided along the upper surface portion of the head assembly P that includes two parallel, laterally spaced rails or flanges 128a and 128b which at all times serve as guides to direct an elongate rigid rack 130 into meshed engagement with the sprocket 120 as best seen in FIGURES 8 and 9. An index marker 134 in the form of an arrow or the like, is rigidly mounted or otherwise defined on the upper surface of the head assembly P and disposed adjacent one of the rails 128a and 128b. Rack 130 has a number of longitudinally spaced marks 132a, 132b, 132c and 132d thereon which permit the rack to be alternately used in adjusting the variable transmission Q by rotation of member 114.

Variable speed transmission Q includes a conventional graduated dial 133 over which a needle 135 moves to indicate the speed at which the transmission drives the gear box 104. The rate at which the elongate member A is drawn between roller C and grinding wheel D is constant. Also, the length of each of the tapered surfaces T-1, T-2, T-3 and T-4 is known. Therefore, knowing the above mentioned rate, as well as the lengths of the tapered surfaces, it will be apparent that each length of member A must be moved laterally toward wheel D a distance equal to the difference between the end diameters thereof during the time it is passing the line 12. Whether by calculation, or by trial and error, settings of the needle 135 are determined relative to dial 133 to form each of the surfaces T-1, T-2, T-3 and T-4 on the member. A written record (not shown) of each of such settings is made, and when the operator of the apparatus sees the end position A-1 move into lateral alignment with one of the index marks AA-1, AA-2, AA-3 or AA-4 on scale AA as shown in FIGURE 5, he rotates wheel 124 to concurrently rotate flexible member 114 and adjust the driving speed of transmission Q to a speed at which the needle 135 is positioned at an appropriate one of the predetermined settings on dial 133. When needle 135 has been adjusted to the proper setting on dial 133, the head assembly P will move toward grinding wheel D at such a rate that one of the tapered surfaces T-1, T-2, T-3 or T-4 is finish ground, just as one of the lines A-2, A-3 or A-4 as the case may be, moves into lateral alignment with the line 12 on grinding wheel D.

At the time a written record is made of the settings of needle 135 relative to dial 133, the wheel 126 is rotated to adjust the transmission Q for each of these settings, and as each of these adjustments is completed, a mark 132a, 132b, 132c and 132d is made on that portion of rack 130 in lateral alignment with index mark 134. By slidably adjusting the rack 130 to place one of the marks 132a, 132b, 132c or 132d opposite index 134, the operator of the apparatus can quickly and easily change the settings of the variable speed transmission Q whereby the head assembly P is driven toward grinding wheel D at the rate required to grind the next of the tapered surfaces on member A.

After grinding of the tapered surfaces T–1, T–2, T–3 and T–4 has been completed, the member A is disengaged from the gripping assembly N shown in FIGURE 4, and is then taken to the heat treating assembly shown in FIGURE 10. The heat treating assembly includes an upwardly extending structure previously mentioned, generally designated by the letter Z, which may be a wall or the like, having a variable speed electric motor 142 supported therefrom by a bracket or shelf 143. Through a gear box 144 motor 142 drives a sprocket 146 at a relatively slow rate. The speed of rotation of the motor 142 and sprocket 146 is controlled by a conventional manually operable control 148 shown diagrammatically in FIGURE 2.

Support Z has vertically extending elongate guides 150 affixed thereto which slidably support an elongate rack 152 that is at all times in meshing engagement with sprocket 146. A first arm 154 extends outwardly from the upper end of the rack 152 and supports a vertically positioned tubular member 156 through which a rod 158 extends downwardly to support a helical spring 160 from the lower end thereof. Spring 160 in turn has a gripping member 162 connected to the lower end thereof. Member 162 is of tubular construction and is adapted to have that portion of the elongate member A adjacent the end A–5 thereof, inserted within the confines thereof. A transverse tapped bore (not shown) is formed in member 162 in which a screw 164 is threaded. When rotated in an appropriate direction screw 164 frictionally contacts the end portion of member A adjacent the end A–5 in member 162 to removably hold it in position therein.

The upper portion of rod 158 is preferably formed with threads 158a that are engaged by a nut 166 that rests on the upper surface of tubular member 156. The lower end of the rack O has a second arm 168 projecting therefrom having a bore extending upwardly therethrough that is in alignment with the bore formed in tubular member 156. A rod 170 extends upwardly through a bore (not shown) formed in second arm 168, and a gripping member 172 of larger transverse cross section than that of rod 170 is affixed to the upper end thereof, with this gripping member resting on the upper surface of the arm 168. Gripping member 172 detachably engages the recess B formed in member A and holds the member in fixed vertical alignment when the upper end thereof is supported by clamp V shown in FIGURE 10. Before being detachably connected to gripping member 172, member A is extended through the coil W forming a part of a high frequency induction heating unit 174. Unit 174 is preferably supported on a shelf or bracket 176 above the liquid level of the oil bath 18.

When the electric motor 142 is energized and the driving sprocket 146 rotates, the rack U may be moved either upwardly or downwardly at a desired rate, depending upon the manual adjustment made to the variable speed control 148 controlling the rate of rotation of the sprocket 146. The use of the heat treating assembly as shown in FIGURE 10, as previously mentioned, is for the purpose of imparting resiliency to the steel defining the elongate member A on which the tapered surfaces T–1, T–2, T–3 and T–4 are formed by sequentially heating portions thereof to a desired predetermined temperature and thereafter quenching same in the bath 18. As the rack U moves downwardly, various markings U–1, U–2, U–3 and U–4 thereon are consecutively brought into horizontal alignment with the index Y, and as these marks are so aligned, the variable speed control 148 is manipulated to regulate the rate of rotation of motor 142 and sprocket 146 to a rate where the metal of elongate member A that is next to be heat treated is heated to the same temperature as the metal of the tapered surfaces T–1, T–2, T–3 and T–4 that has just passed through the induction coil W.

The heat treating of the metal elongate member A has been previously discussed in connection with the method of forming a resilient rod having multiple tapered surfaces formed thereon, and need not again be repeated.

Although the method and apparatus above described which may advantageously be used in carrying out the method have been described in detail, applicant wishes it to be clearly understood that this is a description of presently preferred embodiments of the invention and applicant is not to be limited to the details thereof other than as defined in the appended claims.

I claim:

1. The method of forming a sequence of longitudinally extending tapered surfaces, each having a desired degree of angulation, on an elongate deformable member comprising: rough-forming all but a first end portion of said member into a longitudinally extending taper that progressively decreases in transverse cross section away from said first end portion; removably and rotatably gripping said first end portion; rotating a resilient cylindrical surface at constant speed about a first axis of rotation; rotating a frusto-conical grinding surface at constant speed about a second axis of rotation; disposing said resilient surface and said grinding surface in laterally aligned and laterally separated positions, with said first and second axes being in the same horizontal plane with the adjacent portions of said resilient surface and grinding surface being separated a distance greater than the diameter of said first end portion; moving said member longitudinally to a position where the portion thereof to be ground nearest said first end portion is disposed between said resilient surface and said grinding surface; moving said resilient surface laterally toward said grinding surface until said resilient surface pressure-contacts said elongate member with a sufficient force to frictionally rotate same about the longitudinal axis thereof; moving said rotating elongate member longitudinally between said grinding surface and resilient surface at a constant rate while so maintaining said member that the longitudinal axis thereof is at all times above said horizontal plane; moving said resilient surface laterally toward said grinding surface at a first rate which is so selected as to continuously force the portion of said elongate member closest said first end portion on which the first tapered surface is to be ground into grinding contact with said grinding surface to have said first tapered surface ground thereon as said portion moves longitudinally between said resilient surface and said grinding surface; and subsequently moving said resilient surface laterally toward said grinding surface at a plurality of rates different from said first rate after said first tapered surface has been ground on said elongate member, with each of said plurality of rates being selected as to so move a particular longitudinal portion of said member laterally that a tapered surface of the desired angulation is ground thereon as said particular portion moves between said grinding surface and resilient surface.

2. The method as defined in claim 1 which includes rotating said elongate member in a direction opposite to that in which said grinding surface rotates.

3. The method as defined in claim 1 which includes continuously raising said elongate member during the grinding of said tapered surfaces thereon to at all times maintain the longitudinal axis of said member above a horizontal plane extending between said first and second axes.

4. The method as defined in claim 1 which includes exerting a constant force on said first portion of said elongate member to move same longitudinally between said resilient and grinding surfaces.

5. The method as defined in claim 1 wherein said elongate member is formed from a heat treatable metal and said method includes the further step after said sequence of longitudinally extending tapered surfaces are formed thereon of moving said elongate member in a longitudinally aligned position through a heating zone at a plurality of predetermined different rates, with each of said predetermined rates being selected for a particular one of said longitudinally extending tapered surfaces to subject said metal on which same is defined to a predetermined uniform temperature which is the same temperature as that to which the metal on which the balance of said tapered surfaces is defined is heated when passing through said zone.

6. The method as defined in claim 5 which includes disposing said elongate member in a downwardly depending position as it moves longitudinally through said heating zone.

7. The method as defined in claim 6 which includes applying high frequency electrical energy to said metal during heating thereof when in said zone.

8. The method as defined in claim 7 which includes sequentially quenching said heated sections of said elongate members in a liquid bath that is at all times maintained at a substantially lower temperature than that of one of said sections of said elongate member when in said heating zone.

9. A device for use in forming a sequence of longitudinally extending tapered surfaces, each of a desired but different degree of angulation, on an elongate deformable member comprising: a grinding wheel that includes at least a first frusto-conical grinding surface; means that rotatably support said wheel at a fixed position; first power means that rotate said wheel at a uniform rate; a roller formed with a resilient cylindrical surface laterally spaced from said grinding wheel, said roller and wheel having parallel axes of rotation that lie in substantially the same horizontal plane; second power means that rotate said roller at a constant rate, but in a direction opposite to the direction of rotation of said grinding wheel; second supporting means that slidably support a longitudinally extending section of said elongate member when disposed between said roller and grinding wheel, said second supporting means at all times maintaining the longitudinal axis of rotation of the portion of said elongate member between said grinding wheel and roller being above said horizontal plane; means that draw said elongate member betwen said grinding wheel and roller at a substantially constant rate relative thereto; a laterally movable head that rotatably supports said roller; a power driven variable speed transmission; a cross-feed that is capable of moving said roller supporting head toward said grinding wheel, said cross-feed being actuated by said transmission, and said roller being capable of exerting sufficient laterally directed force on a section of said elongate member disposed between said grinding wheel and roller when said head is so moved to cause rotation of said member due to frictional engagement therewith when said second means is actuated, with said section of said rotating elongate member being ground when said first power means is actuated to rotate said grinding wheel due to said roller moving said section into grinding contact therewith; and adjustable means that regulate said variable transmission means to actuate said cross-feed to move said head and said resilient roller at a plurality of different predetermined rates toward said grinding wheel, with each of said predetermined rates so selected that one of said tapered surfaces is ground on a particular longitudinally extending section of said elongate member as said particular longitudinally extending section moves between said grinding wheel and roller.

10. A device as defined in claim 9 wherein the angulation of said first frusto-conical grinding surface relative to said axis of rotation of said grinding wheel is substantially the average taper of said tapered surfaces to be ground on said elongate member relative to said longitudinal axis thereof.

11. A device as defined in claim 10 wherein said grinding wheel is formed with a second frusto-conical surface adjacent said first surface, said second surface being disposed on that side of said first section that is in the direction which said elongate member moves as it passes between said grinding wheel and roller, with the taper of said second frusto-conical surface relative to said axis of rotation of said grinding wheel being substantially six times said average taper of said tapered surfaces to be ground on said elongate member relative to said longitudinal axis thereof.

12. A device as defined in claim 11 wherein said grinding wheel is formed with a third frusto-conical surface adjacent said first surface but on the side thereof opposite that on which said second surface is situated, with the taper of said third frusto-conical surface relative to the axis of rotation of said grinding wheel being greater than the taper of said second surface.

13. A grinding wheel for use in grinding a plurality of tapered longitudinally extending surfaces on an elongate member, each of which tapered surfaces is of a different degree of angulation relative to the longitudinal axis of said member than that of the other of said surfaces, comprising: a rotatable body having at least the outwardly disposed peripheral portion thereof formed from an abrasive grinding material, said grinding material, being shaped to define a first central frusto-conical surface that is disposed at an angle relative to the axis of rotation of said body that is the average angle of the plurality of tapers to be formed on said member, a second frusto-conical surface that is adjacent to and positioned to one side of said first surface, which second surface is disposed at an angle relative to the axis of rotation of said body equal to substantially six times said average angle of said plurality of said tapered surfaces to be formed on said elongate member, and a third frusto-conical surface is defined in said grinding material that is disposed at an angle relative to the axis of rotation of said body greater than that of said second surface, said third surface being adjacent to said first surface but situated on the side thereof opposite that on which said second surface is located.

References Cited in the file of this patent
UNITED STATES PATENTS

| | | |
|---|---|---|
| 1,709,818 | Binns | Apr. 16, 1929 |
| 2,205,468 | Cramer | June 25, 1940 |
| 2,371,459 | Mittelmann | Mar. 13, 1945 |
| 2,438,239 | Toulmin | Mar. 23, 1948 |
| 2,518,375 | Richards | Aug. 8, 1950 |
| 2,575,346 | Julian | Nov. 20, 1951 |
| 2,855,729 | Render | Oct. 14, 1958 |
| 2,887,829 | Burridge | May 26, 1959 |